Nov. 1, 1938.  J. G. JACKSON  2,135,342
TUBED CAKEPAN
Filed Oct. 31, 1937

INVENTOR.
Joseph G. Jackson
BY
ATTORNEY.

Patented Nov. 1, 1938

2,135,342

UNITED STATES PATENT OFFICE 2,135,342

TUBED CAKEPAN

Joseph G. Jackson, Oak Park, Ill., assignor to The Edward Katzinger Company, Chicago, Ill., a corporation of Illinois Application December 31, 1937, Serial No. 182,851

6 Claims. (Cl. 53—6)

This invention relates to tubed cake pans wherein there is a tube coacting with a central aperture in the bottom of the pan and extending upwardly through the pan to create a center hole or aperture in the products baked therein, and particularly to a pan of this type wherein the sides of the pan flare upwardly and outwardly and the tube has upwardly converging sides.

It is an object of this invention to provide a pan of this construction having means through which the entering portion thereof may be suspended in spaced nested relation to the internal surface of a similarly constructed subjacent pan.

It is a further object of this invention to provide a pan of this nature having a tube whose upper portion is reinforced.

With the above and other objects in view, as will be apparent, this invention consists in the construction, combination and arrangement of parts, all as hereinafter more fully described, claimed and illustrated in the accompanying drawing, wherein:

Figure 1:
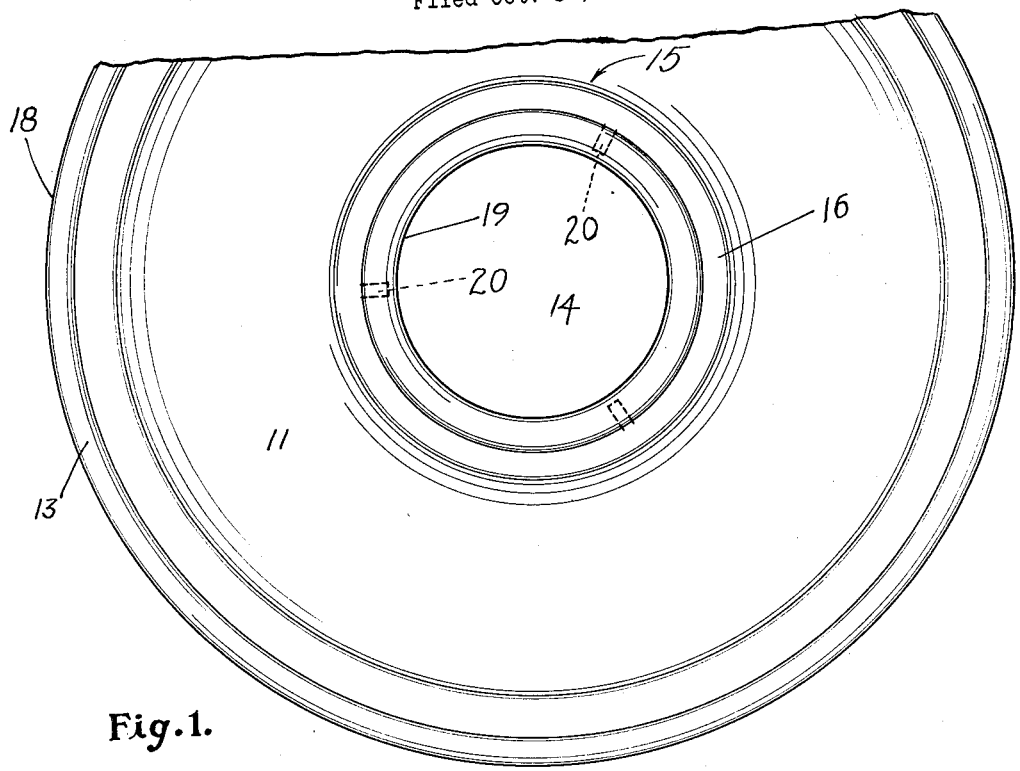
Fig. 1 is a fragmentary plan view of a cake pan embodying the features of this invention.

Tubed cake pans are made in various forms and designs. In many instances the pan is made up of sides flaring upwardly and outwardly and a tube which has upwardly converging sides, to provide a receptacle adapted to be nested within another pan of similar construction to facilitate packing and storage of a plurality of such pans in a relatively limited amount of space. This formation also caused the mouth or upper end of the pan to be of a larger diameter than the bottom end thereof, which facilitated the removal of the pan contents. In nesting a number of these pans in an upright stack, however, the weight of the pans above the bottom pan caused the pans to enter into binding engagement with each other with the result that separation of the pans was made difficult and at the same time the internal surfaces of the pans became marred or discolored frequently creating a discoloration in the baked product. Binding engagement of the nested pans also prevents proper air circulation between the pans for purposes of uniform cooling.

It is also desirable in pans of this type to have the tube project upwardly beyond the plane of the upper edge of the pan sides, in order that the top of the tube may be used to support the pan and the cake in inverted position prior to release of the baked product and for the purpose of preventing shrinkage in volume during the cooling process by the action of gravity. In this form of pan, the product is frequently loosened from the pan by pounding the top edge of the tube against a table or other unloading surface, resulting in deforming of the tube.

The difficulties encountered in prior pans of this type, as pointed out above, are eliminated by the pan construction forming the subject of this invention, in that the entering portion of the pan may be suspended in spaced relation to the interior of a subjacent pan.

Reference being had more particularly to the drawing, the reference numeral 11 designates the bottom of a pan of one-piece cast metal construction, having upwardly and outwardly flaring sides 12 of circular contour terminating in an upper edge 13. Extending upwardly through the pan to create a center hole in the product baked therein and coacting with a central aperture 14 in the bottom of the pan is a tube 15 having upwardly converging circular sides 16 terminating in an upper edge 17 above the plane of the edges 13 of the pan sides 12. The edges 13 and 17 of the pan sides 12 and the tube sides 16, respectively, are preferably enlarged to form reinforcing beads 18 and 19, respectively.

It will be observed that the sides 12 and the sides 16, in connection with the bottom 11, form a tapered receptacle which makes it possible to nest the bottom portion of the pan within the upper edges of a subjacent pan of similar construction.

It will also be noted that the edges 17 of the tube are so offset with respect to the plane of the edges 13 of the pan sides 12 as to provide a support through which the pan and the contents may be sustained in inverted relation prior to release of the contents of the pan.

Figure 2:
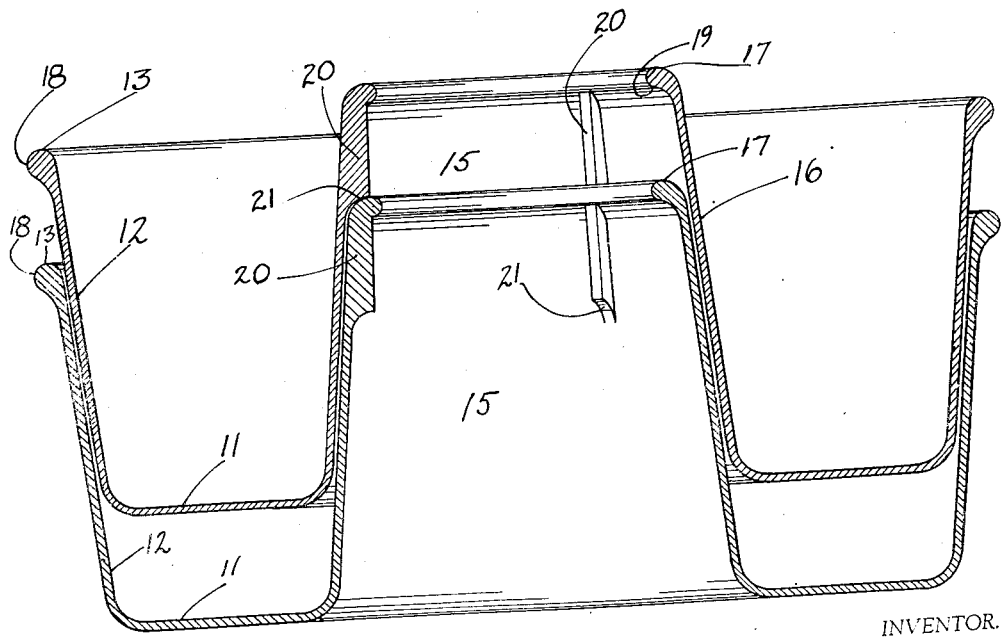
Fig. 2 is a vertical section of a pair of cake pans constructed as shown in Fig. 1, when in nested relation.

In providing means through which the entering portion of the pan may be suspended in spaced relation to the interior of a similarly formed subjacent pan, it is preferable to employ a device which is removed from the surface of the pan normally contacting with the product baked therein. To this end, the internal surface of the tube 15 is provided with a series of circumferentially spaced ribs 20 which extend downwardly from the undersurface of the bead 19 at the upper edge of the tube and terminate in a shoulder 21 at their lower ends. The surface of the shoulder 21 is preferably shaped to conform with the upper contour of the bead 19 whereby the bead 19 of a subjacent pan may have snug and firm engagement therewith. As shown in Fig. 2, engagement of the bead 19 of a subjacent pan with the shoulder 21 of the nested pan serves to suspend the bottom and sides of the nested pan in spaced relation to the interior of the subjacent pan.

It will be observed, that the ribs 20, in backing up the undersurface of the bead 19, provides a substantial stiffening of that region of the tube ordinarily subjected to excessive axial thrust.

It is, of course, obvious that this invention is susceptible of various modifications which are within the spirit of the invention without departing from the scope of the following claims, it being understood that the present disclosure is by way of illustration only and it is not to be taken as restrictive of its conception.

What is claimed is:

1. A cake pan having a central tube and side walls to provide a receptacle adapted to be nested within a pan of similar construction, the inner surface of the tube having outstanding means engageable by the upper edge of the tube of a subjacent pan in advance of tight nesting of the pans.

2. A cake pan having a central tube and side walls to provide a receptacle adapted to be nested within a pan of similar construction, the inner surface of the tube having outstanding ribs extending downwardly from the upper edge thereof terminating in a shoulder engageable by the upper edge of the tube of a subjacent pan in advance of tight nesting of the pans.

3. A cake pan having a central tube and side walls to provide a receptacle adapted to be nested within a pan of similar construction, said tube having a thickened upper portion extending in offset relation to the internal surface of the tube.

4. A cake pan having a central tube and side walls to provide a receptacle adapted to be nested within a pan of similar construction, the internal surface of the tube having an offset portion conforming with the contour of the upper edge of the tube.

5. A cake pan having a centrally apertured bottom and upwardly and outwardly flaring sides, a tube coacting with said bottom aperture and having upwardly converging sides terminating in an upper edge above the plane of the upper edge of the pan sides, and an offset associated with the internal surface of said tube arranged intermediate the planes of the upper edge of the pan sides and the lower limits of the tube.

6. A cake pan having a centrally apertured bottom and upwardly and outwardly flaring sides, a tube coacting with said bottom aperture and having upwardly converging sides terminating in an upper edge above the plane of the upper edge of the pan sides, a bead at the upper edge of said tube, a rib associated with the internal surface of said tube extending from said bead at the upper edge of said tube and terminating intermediate the planes of the upper edge of the pan sides and the bottom of the pan in a shoulder having an undersurface of a contour conforming to the contour of the upper edge of the tube.

JOSEPH G. JACKSON.